US010162785B2

(12) United States Patent
Burke et al.

(10) Patent No.: US 10,162,785 B2
(45) Date of Patent: Dec. 25, 2018

(54) WIRELESS ELECTRONIC DEVICE CONTROLLER

(71) Applicant: Acceltex Solutions, LLC, San Antonio, TX (US)

(72) Inventors: Carter J. Burke, San Antonio, TX (US); Chris Marco, San Antonio, TX (US)

(73) Assignee: ACCELTEX SOLUTIONS, San Antonio, TX (US)

( * ) Notice: Subject to any disclaimer, the term of this patent is extended or adjusted under 35 U.S.C. 154(b) by 247 days.

(21) Appl. No.: 15/155,798

(22) Filed: May 16, 2016

(65) Prior Publication Data
US 2016/0342183 A1    Nov. 24, 2016

Related U.S. Application Data

(60) Provisional application No. 62/164,954, filed on May 21, 2015.

(51) Int. Cl.
G06F 13/00 (2006.01)
H04L 12/00 (2006.01)
(Continued)

(52) U.S. Cl.
CPC ...... G06F 13/4247 (2013.01); H04L 12/2803 (2013.01); Y02D 10/14 (2018.01); Y02D 10/151 (2018.01)

(58) Field of Classification Search
CPC ............ G06F 13/4247; H04L 12/2803; Y02D 10/151; Y02D 10/14
See application file for complete search history.

(56) References Cited

U.S. PATENT DOCUMENTS 6,841,945 B1 * 1/2005 Elwell ................ H05B 37/0227
                                                        315/153
8,729,834 B1 * 5/2014 Funderburk ....... H05B 37/0245
                                                        315/312
(Continued)

FOREIGN PATENT DOCUMENTS

KR     100969855 B1    7/2010
KR     101182599 B1    9/2012
(Continued)

OTHER PUBLICATIONS

Taiwan Office Action dated Dec. 1, 2016 for Application No. 105115989.
(Continued)

*Primary Examiner* — Ronald D Hartman, Jr.
(74) *Attorney, Agent, or Firm* — Patterson + Sheridan, LLP

(57) ABSTRACT

Embodiments include an integrated configurable electronic device controller for controlling at least one load coupled to the controller. The controller includes a communications interface operable to communicate via a wireless communications protocol, a configurable port and a processing system. The processing system is configured to receive, via the communications interface, one or more instructions for controlling power of the at least one load. The processing system is also configured to monitor one or more operating parameters of the at least one load. The processing system is further configured to generate one or more signals to control the power of the at least one load based, at least in part, on the received instructions and the monitoring; and report, via the communications interface, the one or more operating parameters to a management system.

10 Claims, 10 Drawing Sheets

(51) Int. Cl.
      *G06F 13/42*       (2006.01)
      *H04L 12/28*       (2006.01)

(56) References Cited

U.S. PATENT DOCUMENTS

| | | | |
|---|---|---|---|
| 2011/0046792 A1* | 2/2011 | Imes | F24F 11/006 |
| | | | 700/278 |
| 2011/0202293 A1* | 8/2011 | Kobraei | G06Q 10/06 |
| | | | 702/62 |
| 2012/0169242 A1* | 7/2012 | Olson | H05B 37/0227 |
| | | | 315/159 |
| 2014/0236323 A1* | 8/2014 | Brown | G02F 1/163 |
| | | | 700/90 |
| 2015/0061503 A1 | 3/2015 | Billard et al. | |

FOREIGN PATENT DOCUMENTS

| | | |
|---|---|---|
| KR | 1020130005769 A | 1/2013 |
| KR | 1020140098395 A | 8/2014 |
| TW | M441805 U | 11/2012 |
| TW | 201404183 A | 1/2014 |
| TW | M478187 U | 5/2014 |
| TW | I440399 B | 6/2014 |
| TW | 201509193 A | 3/2015 |
| TW | 201516984 A | 5/2015 |

OTHER PUBLICATIONS

International Search Report and Written Opinion of related application PCT/US2016/033548 dated Aug. 16, 2016.
Taiwan Office Action dated Apr. 17, 2017 for Application No. 105115989.

\* cited by examiner

WIRELESS ELECTRONIC DEVICE CONTROLLER

CROSS-REFERENCE TO RELATED APPLICATION

This application claims benefit of U.S. Provisional Patent Application Ser. No. 62/164,954, filed on May 21, 2015, and titled "WIRELESS ELECTRONIC DEVICE CONTROLLER," which is incorporated by reference herein in its entirety.

BACKGROUND

Field

Embodiments of the present disclosure generally relate to electronic devices, and more particularly to an integrated configurable wireless electronic device controller.

Description of the Related Art

In recent years, there has been a demand for various different systems (e.g., in residential and commercial facilities) to become energy efficient. However, implementing energy efficient systems has proven to be costly and complex, especially when buildings are increasingly incorporating more electronic devices into their systems. Further, controlling electronic devices and monitoring their power usage has proven to be difficult due to the inflexibility of centralized control systems.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include, among others, an integrated configurable wireless electronic device controller configured to control a plurality of different types of electronic devices (or loads).

Aspects of the present disclosure generally relate to control of electronic devices, and more particularly, to an integrated configurable wireless electronic device controller.

One embodiment of the present disclosure provides an integrated configurable electronic device controller for controlling at least one load. The controller includes a communications interface operable to communicate via a wireless communications protocol, a configurable port and a processing system. The processing system is configured to receive, via the communications interface, one or more instructions for controlling power of the at least one load. The processing system is also configured to monitor one or more operating parameters of the at least one load, and generate one or more signals to control the power of the at least one load based, at least in part, on the received instructions and the monitoring. The processing system is further configured to report, via the communications interface, the one or more operating parameters to a management system.

Another embodiment of the present disclosure provides an integrated configurable electronic device controller for controlling at least one load. The controller includes a communications interface operable to communicate via a wireless communications protocol, a sensor port operable to interface with at least one sensor, and a processing system. The processing system is configured to receive, via the communications interface, one or more instructions for controlling power of the at least one load in an environment. The processing system is also configured to monitor one or more operating parameters of the at least one load, and receive, via a wall switch, one or more signals for controlling power to the at least one load, and receive, from at least one sensor coupled to the sensor port, one or more inputs indicative of at least one of ambient light conditions, temperature, and occupancy of the environment. The processing system is further configured to generate one or more signals to control the power of the at least one load based, at least in part, on the received instructions, monitored one or more operating parameters, and the received one or more signals from the wall switch.

Still another embodiment of the present disclosure provides a wireless electronic device control system. The system includes a plurality of loads daisy chained to a circuit, a management system, and a load controller electronically coupled to the circuit. The load controller includes a communications interface operable to communicate via a wireless communications protocol, a configurable port, a processing system. The processing system is configured to receive, via the communications interface, one or more instructions for controlling power of at least one load of the plurality of loads, and receive, via the configurable port, one or more inputs for adjusting a power level of the at least one load. The processor is also configured to generate one or more signals to control the power level of the at least one load based, at least in part, on the received one or more instructions and the received one or more inputs, and report, via the communications interface, the received one or more inputs to the management system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this invention and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments presented herein describe techniques, apparatus, systems, etc., that may be used to provide power control (e.g., on/off control), dimming control, manual (local switch) override, power monitoring functions (e.g., measuring energy consumption of one or more loads), power management, etc., to a plurality of different types of loads via one or more integrated configurable wireless electronic device controllers.

As will be described in more detail below, the electronic device controller (or load controller) can communicate via any wireless network (e.g., such as any network based on IEEE 802.11 communication standards, Global System for Mobile Communications (GSM), Long Term Evolution (LTE), and others), which allows for flexible control of the device controller and/or the loads (or electronic devices) connected to the device controller. Further, the electronic device controller can be configured to interface with one or more sensors, which allows the electronic device controller to adapt to changing conditions within any particular system or (indoor and/or outdoor) environment, monitor energy consumption within systems and/or feedback information regarding power usage (e.g., to a user, management system, etc.).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. It should be noted that the figures discussed herein may not be drawn to scale and may not indicate actual or relative sizes.

Figure 1:
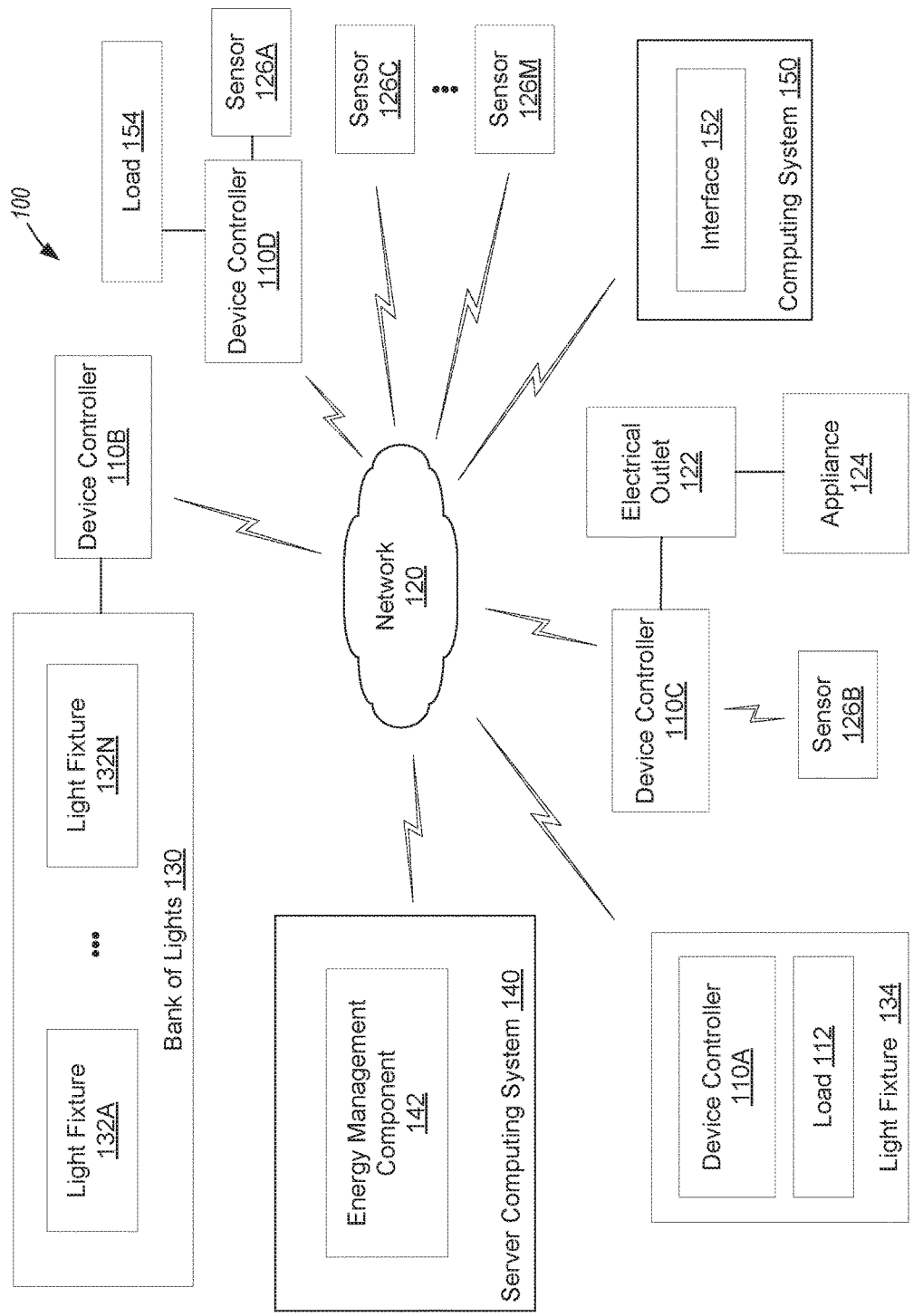
FIG. 1 illustrates an architecture of example systems that may incorporate one or more integrated configurable wireless electronic device controllers, according to embodiments of the present disclosure.

FIG. 1 illustrates an example architecture of an environment 100 that includes one or more electronic device controllers 110 configured to control one or more electronic devices, according to the various embodiments presented herein. The environment 100 can be an example of different residential and/or commercial environments, some of which may include lighting applications, heating applications, power monitoring, electronic application control, etc. As described below, one or more electronic device controllers can be configured to control the different types of loads within these applications. Examples of these loads can include tungsten, electronic ballast, magnetic ballast, LED driver, general purpose loads, motor loads, incandescent type loads, resistive type loads, electronic low voltage transformers, and others.

As shown, the environment 100 includes one or more electronic device controllers 110A, 110B, 110C and 110D. Each of the electronic device controllers 110A-110D is configured to control one or more electronic devices (or loads) (e.g., ballasts, motors, appliances, etc.). For example, the electronic device controllers 110A-110D can be configured to provide power control (e.g., on/off control) and/or dimming control to the electronic devices. The electronic device controllers 110A-110D can also be configured to monitor one or more operating parameters (e.g., such as energy consumption, current information, etc.) of the electronic devices, report the operating parameters to a user (or other system), and adapt the operation of the electronic devices (e.g., based on a wireless energy policy control). For example, each of the electronic device controllers 110A, 110B, 110C and 110D may include one or more processors configured to maintain a desired energy usage by autonomously powering on/off one or more loads (connected to the device controller) based on a desired energy usage set by a user, commands received via a network 120, changing conditions within the particular environment, etc.

In some embodiments, the electronic device controllers 110 can be integrated directly within electronic devices (e.g., such as light fixtures, etc.). For example, as shown in FIG. 1, the electronic device controller 110A is integrated into lighting fixture 134, which may be mounted to a ceiling or elsewhere, and is configured to control lighting load 112 (or ballast) within the lighting fixture. In some embodiments, the electronic device controllers can be mounted external (e.g., outside of or remotely from) one or more electronic devices. For example, as shown in FIG. 1, the electronic device controller 110B can be configured to control a bank of lights 130 which include a plurality of lights 132A-132N in series (or other configuration). Providing the ability to install the electronic device controllers in different installation configurations may provide flexibility when retrofitting one or more light fixtures to have advanced power control and/or monitoring capabilities. Different installation configurations also provide flexibility when installing new light fixtures (e.g., in new construction).

In some embodiments, the electronic device controllers can also be configured to control and/or monitor electronic devices connected via a single circuit. For example, as shown in FIG. 1, the electronic device controller 110C is configured to control and/or monitor appliance (or electronic device) 124 via electrical outlet 122. In such a configuration, the electronic device controller 110C can be configured to monitor every device connected to one or more wall plugs (or electrical outlets 122) that share a common circuit. Such devices may include several different household and office appliances, ranging from printers, coffee makers, refrigerators, televisions, etc. As such, the electronic device controller disclosed herein provides greater flexibility compared to existing control systems.

Each of the electronic device controllers 110A-110D is capable of communicating with server computing system 140 and/or computing system 150 via network 120. The network 120, in general, may be a wide area network (WAN), local area network (LAN), wireless LAN (WLAN), personal area network (PAN), power line communications (PLC), a cellular network, etc. In a particular embodiment, the network 120 is the Internet. Computing systems 140 and 150 can be any kind of physical computing system having a network interface such as a desktop computer, laptop computer, mobile device, tablet computer, server, embedded systems, etc.

In some embodiments, the electronic device controllers 110A-110D may communicate via the network 120 with an energy management component 142 within the server computing system 140. For example, in some cases, one or more different portions of the environment 100 may be a part of a larger network that is managed by the energy management component 142. The energy management component 142 could be located on-premises (e.g., in the particular environment in which the various electronic devices are used) or could be located in the cloud. The energy management component 142, for example, could be configured to collect (measure) energy usage information for the different electronic devices currently powered on in a particular environment (e.g., building) and configured to maintain a predefined desired energy usage level (e.g., set by a building administrator). As such, the electronic device controllers provided herein can be used to aid the energy management component 142 with the collection of information. For example, as noted above, the electronic device controllers 110A-110D are configured to monitor (or measure the energy consumption of) a plurality of different loads, and monitor changing conditions within a particular environment (e.g., via sensors 126A-126M). The electronic device controllers can provide such information to the energy management component 142, which allows users (or administrators) to review energy consumption, set energy policy rules for their environments, etc.

In some embodiments, computing system 150 allows a user to directly interact with the electronic devices 112, 124, 130, 154, etc. via electronic device controllers 110A-110D. For example, computing system 150 includes an interface 152 that allows users to configure power settings of the electronic devices, monitor energy usage of the electronic devices, control sensors 126A-126M, etc. The interface 152 can be representative of a local application (or "app"), web browser, mobile web browser, etc. Alternatively or additionally, a user can use the interface 152 to interact with the energy management component 142 within server computing system 140.

As noted above, the electronic device controllers 110A-110D can monitor one or more operating conditions in the environment 100 via sensors 126A-126M. Examples of such sensors can include temperature sensors, occupancy sensors, ambient light sensors, humidity sensors, pressure sensors, air quality sensors, and the like. In some cases, the electronic device controllers 110A-110D can use the sensors to determine changes or variations in a particular environment (e.g., such as whether the environment is occupied), and adjust the operation of the electronic devices in that particular environment based on the detected changes. The electronic device controller can connect to one or more sensors via a wired or wireless connection. As shown in the environment 100, for example, the device controller 110D, which controls load 154, may connect to the sensor 126A via a wired connection. In another example, the device controller 110C may connect to the sensor 126B via a wireless connection. In some embodiments, the electronic device controller 110 can connect to one or more sensors 126C-126M via the network 120.

In one embodiment, as described in more detail below with reference to FIGS. 8-9, the electronic device controller 110 can be configured to connect to multiple sensors 126. For example, in one implementation, the electronic device controller 110 can connect to multiple sensors 126 via a device (e.g., a splitter, switch, hub, etc.) that allows the electronic device controller 110 to select and communicate with any one of the multiple sensors 126. In another implementation, multiple sensors 126 can be daisy-chained (e.g., wired together in series) and the electronic device controller 110 can connect to the daisy-chained sensors. In this particular implementation, the electronic device controller 110 would connect to the first sensor in the daisy-chain, and any communication to other sensors in the daisy-chain would propagate from the first sensor through any intervening sensors in the daisy-chain, and vice versa. In yet another implementation, the electronic device controller can communicate wirelessly with multiple sensors 126 using any wireless communication protocol. For example, in this implementation, one or more of the sensors 126 (e.g., such as sensor 126B) may be battery operated sensors that are configured to communicate with the electronic device controller 110 via a wireless technology (e.g., such as WiFi).

Note that the electronic devices and configuration of electronic device controllers illustrated in FIG. 1 are provided as a reference example of an environment in which the electronic device controllers disclosed herein may be used to increase energy efficiency of different environments, such as residential and/or commercial buildings. In general, those of ordinary skill in the art will recognize that other deployment scenarios are possible. For example, although environment 100 illustrates an indoor environment, the electronic device controller disclosed herein can also be deployed (to control one or more loads) in an outdoor environment. In one case, for example, the electronic device controller can be configured to control street lights, lights in parking garages, outdoor pavilions, and the like. Further, in one embodiment, the controllers can be configured to communicate with the network via a LAN (e.g., Ethernet). In addition, those of ordinary skill in the art will recognize that the types of electronic devices, the number of electronic devices and/or the particular configuration of electronic devices and/or electronic device controllers may be adapted for different types of environments.

Figure 2A:
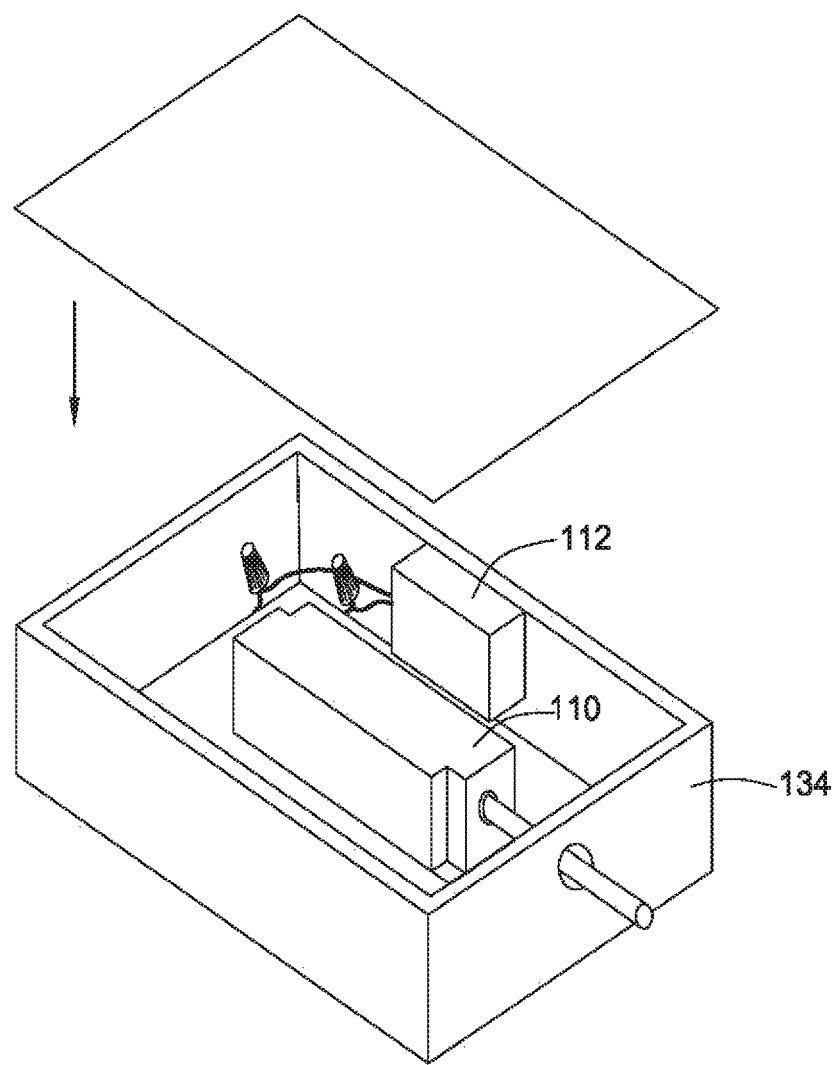
FIG. 2A illustrates an example light fixture system that includes an integrated configurable wireless electronic device controller, according to embodiments of the present disclosure.
Figure 2B:
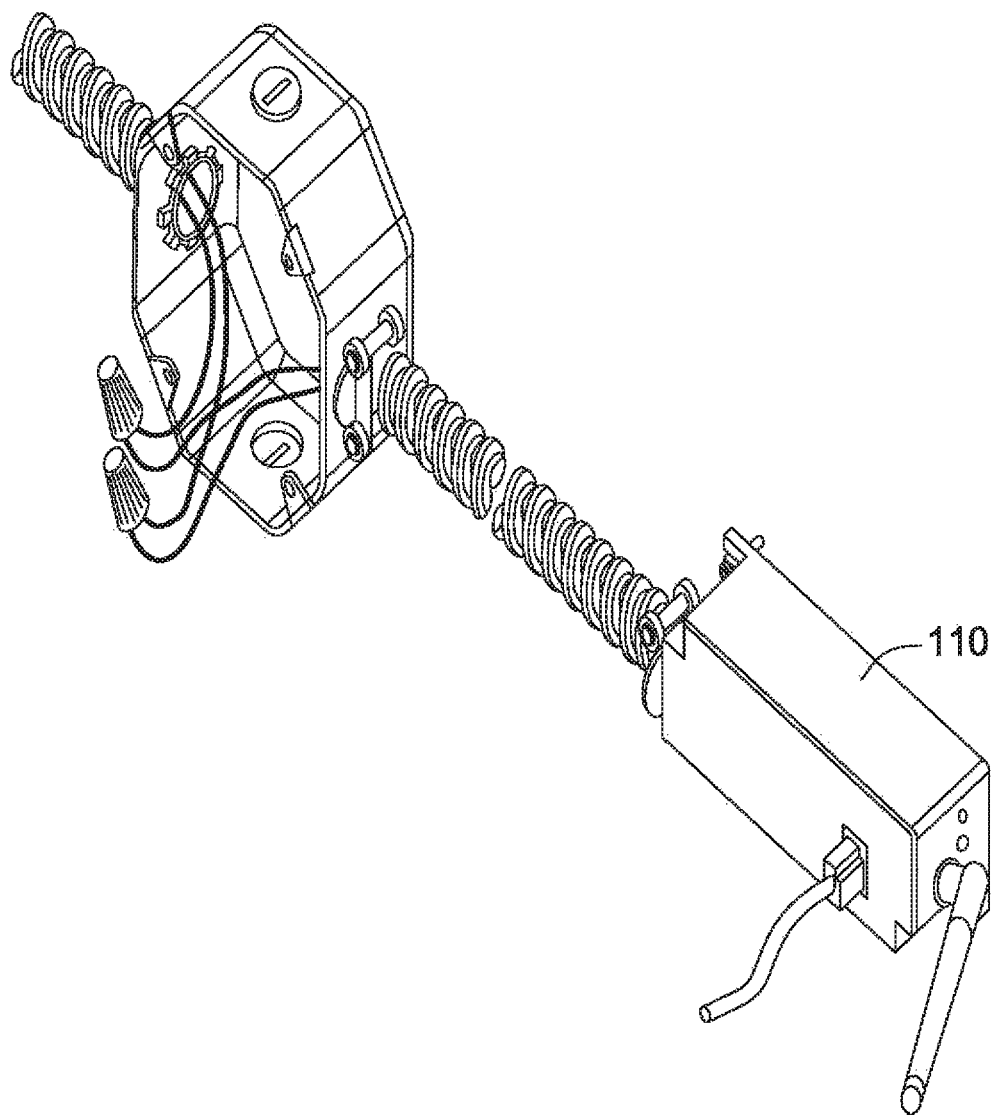
FIG. 2B illustrates another example light fixture system coupled to a wireless electronic device controller, according to embodiments of the present disclosure.

FIGS. 2A-2B illustrate different examples of how an electronic device controller described herein can connect to an electronic device, according to embodiments of the present disclosure. As shown in FIG. 2A, if the electronic device controller 110 is used for a lighting application, the electronic device controller 110 and the load 112 can be integrated into the lighting fixture 134. In another embodiment, as shown in FIG. 2B, the electronic device controller 110 can be mounted external (e.g., outside of or remotely from) to a single light fixture or a bank of lights. In this manner, the electronic device controller is capable of being installed in pre-existing light fixtures (e.g., retro-fit applications) and/or in new light fixtures (e.g., in new construction).

Note FIGS. 2A-2B illustrate merely one reference example of how electronic device controllers can be integrated or coupled to electronic devices, such as lighting fixtures. Those of ordinary skill in the art will recognize that the electronic device controllers disclosed herein can also be integrated and/or coupled to other types of electronic devices.

Figure 3:
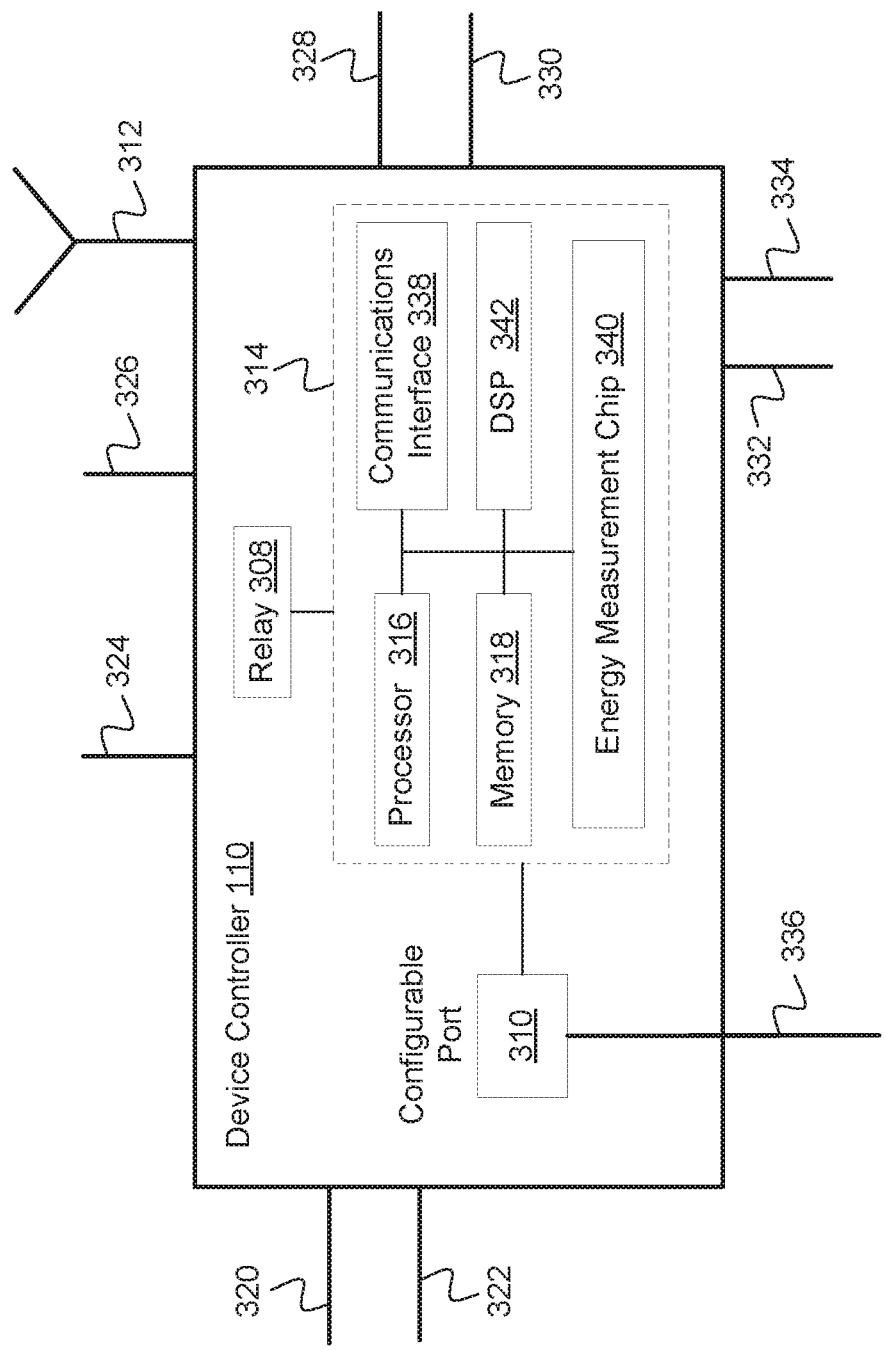
FIG. 3 illustrates a block diagram of an example integrated configurable wireless electronic device controller, according to embodiments of the present disclosure.

FIG. 3 is a block diagram of an integrated configurable wireless electronic device controller 110, according to one embodiment. As shown, the wireless electronic device controller 110 includes at least one processor 316, memory 318, communications interface 338, digital signal processor (DSP) 342, energy measurement chip 340, a relay 308, and a configurable port 310. In some embodiments, the processor 316, memory 318, communications interface 338, DSP 342, and energy measurement chip 340, may be included within a processing system 314. Line inputs 320 and 322 may be coupled to a power source (e.g., a 120-277V AC power source). Switched line input 324 and switched line output 326 may be connected to two different sides of the relay 308. Wire 328 may be used to couple to a wall switch, which allows the controller 110 to detect status changes in an external switch. Wire 330 may be used to couple to (neutral) of a load that is coupled to the controller 110. Dimming output lines 332 and 334 may be used to provide dimming control to at least one load (coupled to the controller 110) that supports a dimming protocol.

The processor 316 is generally configured to control the operation of the device controller 110. In some cases, the processor 316 may also be referred to as a central processing unit (CPU). Memory 318, which may include read-only memory (ROM) and/or random access memory (RAM), provides instructions and data to the processor 316. A portion of the memory 318 may also include non-volatile random access memory (NVRAM). The processor 316 is configured to perform the techniques presented herein based on instructions stored in memory 318. According to aspects, the processor 316 is configured to provide power control, dimming control, energy consumption measuring capabilities, etc., to one or more loads coupled to the wireless device controller. To provide power (on/off) control to a load, the processor 316 may use the relay 308 as an output switch device to allow current (e.g., from switched line input 324 to switched line output 326) to flow to at least one load. In various embodiments, in order to support control of one than one load, the controller 110 may incorporate a relay rated for a higher maximum steady state current. For example, for certain resistive type loads, the controller 110 may incorporate a relay rated for maximum steady state current of 16 amps. In other cases, the controller 110 may incorporate even larger relays to support even greater loads. When coupled to one or more dimmable loads, the processor 316 is configured to provide dimming control (e.g., 0 to 10 V dimming control) to the one or more dimmable loads (e.g., using dimming output control lines 332 and 334). The processor 316 is capable of pulse width modulation (PWM) and is capable of powering one or more devices. For example, in one embodiment, the processor is capable of providing 0-10V output.

The communications interface 338 may include a transmitter and a receiver (not shown) that allow the controller 110 to communicate, via at least one antenna 312, with a plurality of wireless communication networks that implement one or more radio access technologies (RATs). In one example, the wireless communication network may include a wireless local area network (WLAN). Examples of WLAN may include, but are not limited to, RATs such as Wi-Fi or IEEE 802.11 based technologies, and the like. In another example, the wireless communication network may include a WWAN. Examples of WWANs may include, but not be limited to, RATs such as LTE, Universal Mobile Telecommunication System (UMTS), cdma2000, GSM, and the like. In general, however, the controller 110 may be capable of communicating via any wireless communication protocol. It should be noted that although the antenna 312 is shown external to the controller 110, in some embodiments, the antenna 312 is within the controller 110.

The controller 110 may use the energy measurement chip 340, which is coupled to the processor 316, to measure energy consumed by one or more electronic devices (or loads) and provide the data to the processor 316. The controller 110 may also use the DSP 342 to process signals received via the communications interface 338.

The port 310 is generally a configurable port that can be used for one or more different functions. In one embodiment, for example, the port 310 is configured to interface with a sensor (e.g., such as a temperature sensor, occupancy sensor, ambient light sensor, humidity sensor, pressure sensor, air quality sensor and the like) and the processor is configured to receive input(s) from the sensor via the port 310. The port 310 is generally configured to support a registered jack (RJ) interface, such as RJ12, RJ45, etc. To interface between the port 310 and the sensor, a cable 336 capable of supporting the registered jack standard (e.g., RJ12 cable, RJ45 cable, etc.) may be used. The RJ cable 336 is configured to carry signals and/or power from the port 310 to the sensor and is configured to carry signals from the sensor to the controller 110.

Figure 4A:
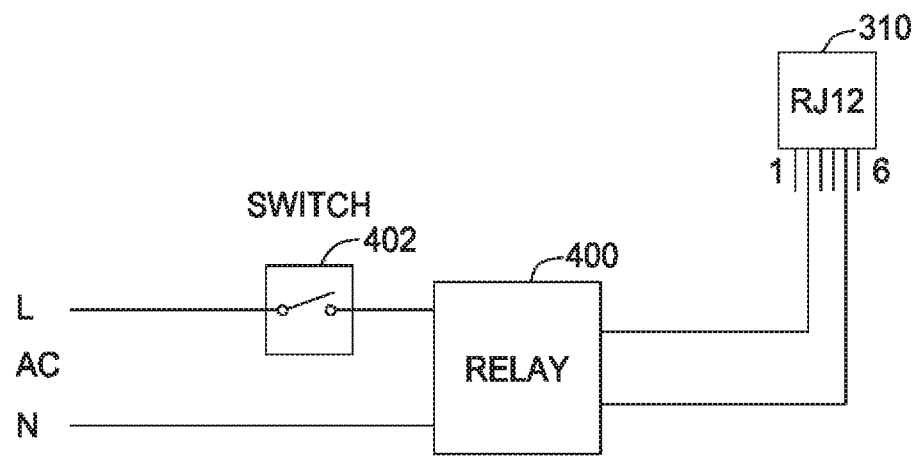
FIGS. 4A and 4B illustrate example configurations of a configurable port within an integrated configurable wireless electronic device controller, according to embodiments of the present disclosure.

In another embodiment, the port 310 is configured to interface with an external wall switch (e.g., via an external relay). As shown in FIG. 4A, a RJ cable (e.g., RJ12) can be used to connect to the wall switch 402 via external relay 400. When configured in this manner, the port (e.g., called a manual override port, for the sake of convenience) can monitor for a manual override signal (or command) sent in response to a manual flip of the switch 402. For example, in one case, upon flipping the switch 402, the relay 400 may be energized in such a way (e.g., depending on whether the relay 400 is normally open or normally closed) that the signal from the switch circuit can flow to controller 110. Upon reaching the controller 110, the processor within the controller can determine whether to modify the power control to the load (e.g., in this case a ballast within a lighting fixture) based on the override signal. In addition, based on the power override signal, the processor may also be configured to provide the information to a management system. Such information may be useful especially in circumstances when the management system is unable to detect changing conditions in a particular indoor or outdoor environment.

Figure 4B:
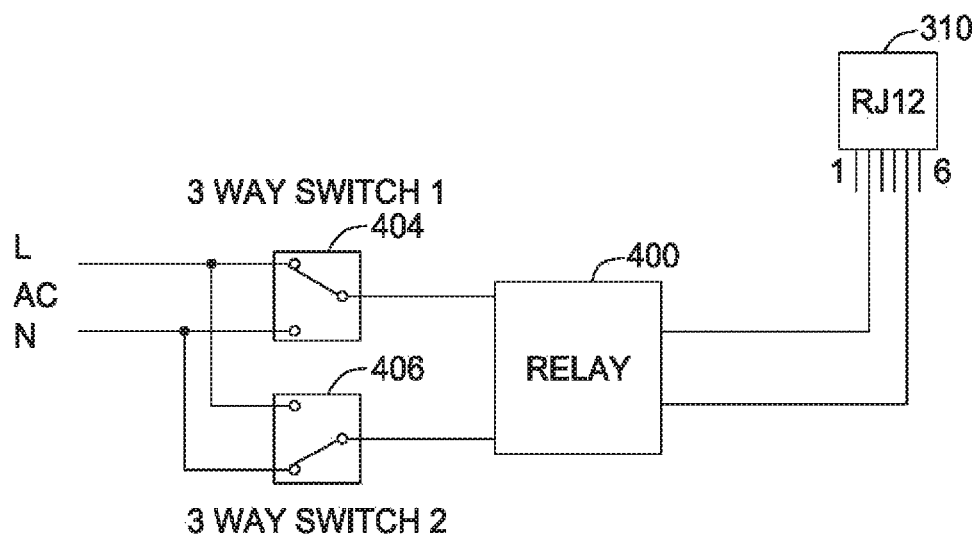

In another example, the controller 110 is configured to support three-way switching via the port 310. As shown in FIG. 4B, for example, a RJ cable (e.g., RJ12) can be used to connect to a first three-way wall switch 404 and a second three-way wall switch 406 via external relay 400. When configured in this manner, the port 310 can monitor for an override signal from multiple wall switches and determine whether to modify the power control to the load (e.g., for lighting) based on the override signal.

Alternatively, in another embodiment (described in more detail below with respect to FIGS. 6A-6B), instead of using the port 310 to interface with an external wall switch (e.g., such as switches 402, 404, 406), the controller 110 can include circuitry that is configured to interface with an external wall switch and monitor the wall switch for override signals. Configuring the controller 110 in this manner can provide users with additional deployment options for the controller 110 for monitoring and/or controlling electronic devices.

As mentioned above, the integrated configurable wireless controller disclosed in the various embodiments of the present disclosure provides a flexible, low-cost solution to controlling a variety of different loads. For example, the controller incorporates a single integrated design that allows for any load (coupled to the controller) to be controlled remotely, e.g., via any device connected to the network, or allows for the load to be controlled autonomously based on the particular sensor(s) incorporated into (or communicatively coupled to) the wireless controller.

Figure 5A:
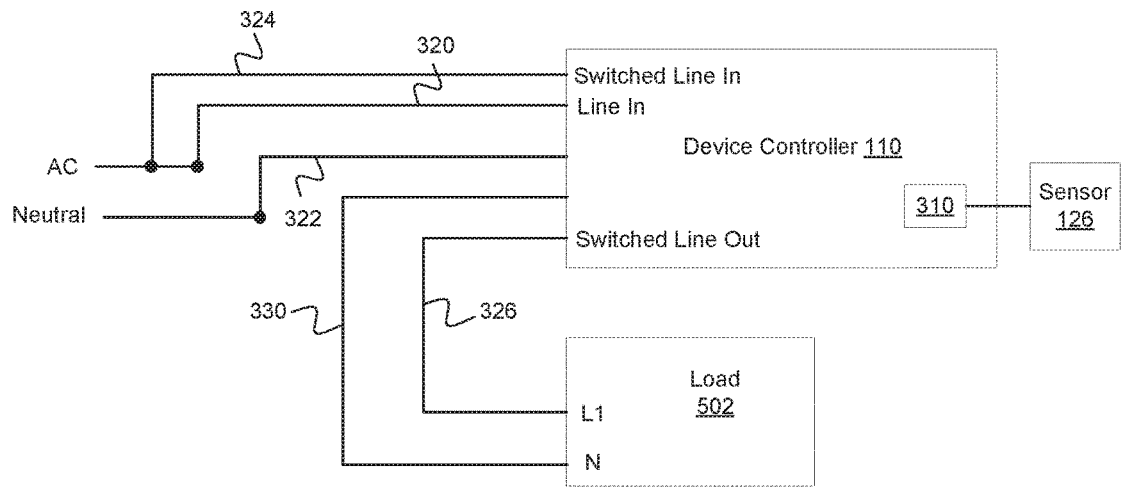
FIGS. 5A and 5B show wiring configurations of an integrated configurable wireless electronic device controller when operating in one mode of operation, according to embodiments of the present disclosure.

As one example of the controller's flexibility to be integrated in different applications/scenarios, the controller is capable of operating in one or more different modes. FIG. 5A, for example, illustrates one mode of operation in which the controller 110 is configured to provide on/off control to the load 502. As shown, when operating in this mode, the controller 110 and the load 502 are powered by a same AC source (e.g., 120-277V, in one case). For example, line input 320 and switched line input 324 are connected to the same V AC source. The switched line input 324 may be connected to one contact of the relay 308 (not shown) in the controller. The other contact of the relay 308 may be connected to the switched line output 326, which is used to provide power on/off control to the load 502.

Figure 5B:
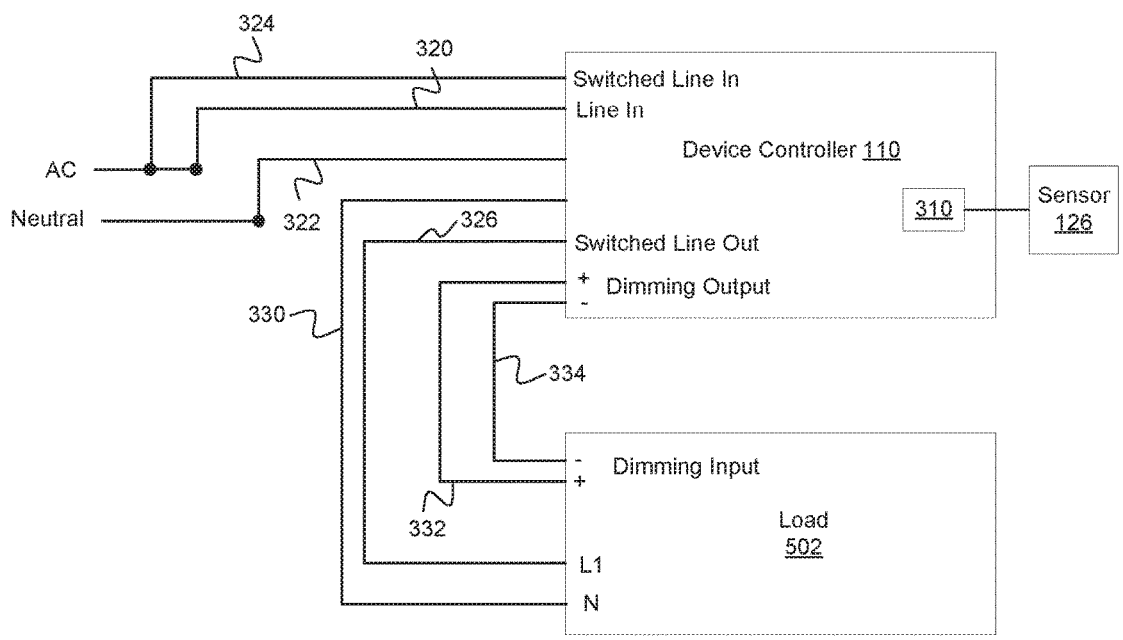

Referring now to FIG. 5B, FIG. 5B also shows another mode of operation in which the controller 102 is configured to provide on/off control and/or dimming control to the load 502, according to another embodiment of the present disclosure. FIG. 5B differs from FIG. 5A in that (in FIG. 5B) the controller 110 is configured to provide dimming control (e.g., 0-10 V dimming) to the load 502 via dimming output control lines 332 and 334. Dimming control of the load may be supported when the load supports a dimming protocol (e.g., the load is a dimming ballast). In this embodiment, the controller 110 and load 502 are also powered by the same AC source.

Figure 6A:
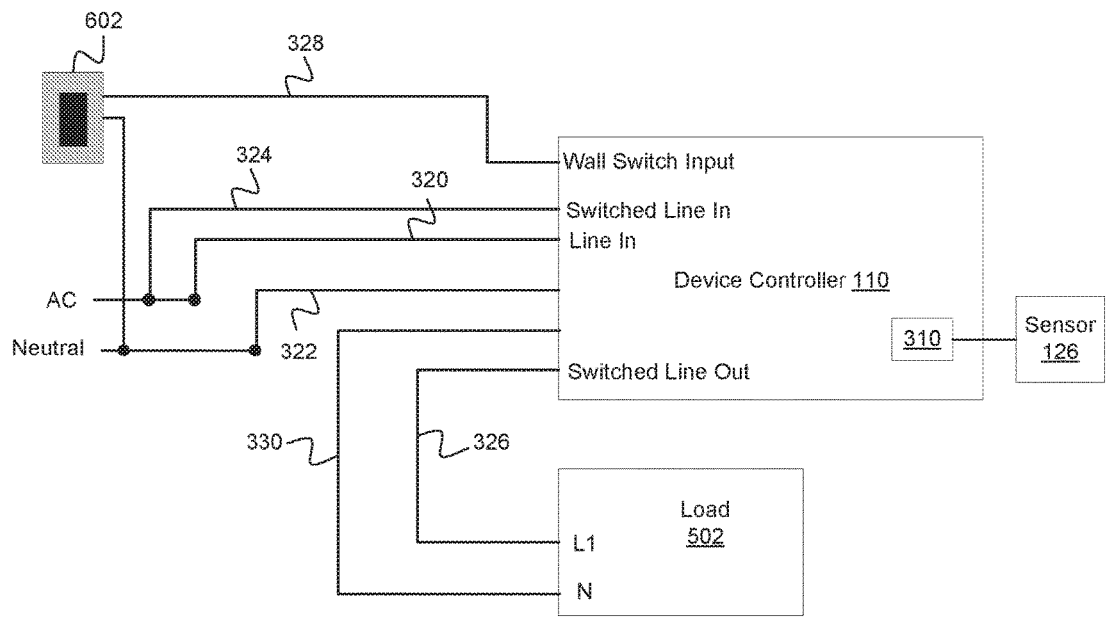
FIGS. 6A and 6B show wiring configurations of an integrated configurable wireless electronic device controller when operating in another mode of operation, according to embodiments of the present disclosure.
Figure 6B:
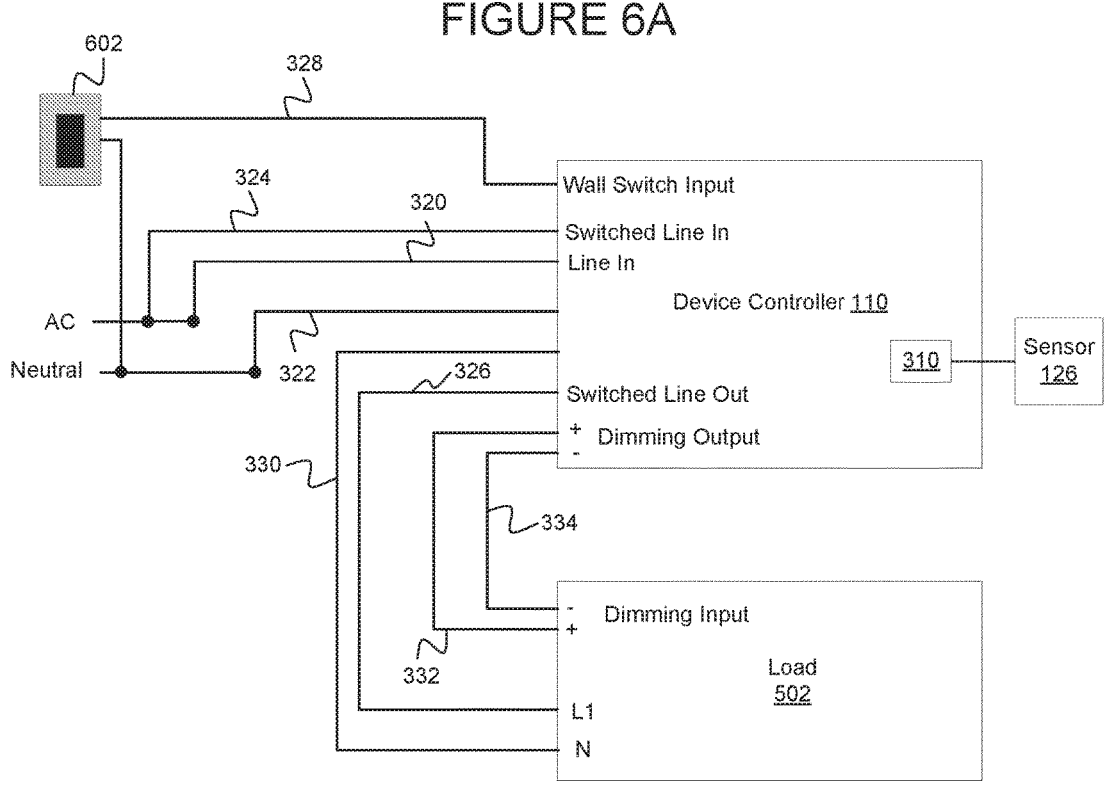

As mentioned above, in some embodiments, the controller 110 may include circuitry that allows the controller 110 to interface with a wall switch and detect override signals via the wall switch. FIGS. 6A and 6B show examples where the controller 110 can be configured to control electronic devices based on signals detected via an external wall switch 602. In the embodiment shown in FIG. 6A, the controller 110 is configured to provide power on/off control to the load 502 (e.g., in a similar configuration as FIG. 5A). The controller 110 and load 502 are also powered by the same AC source. However, in this embodiment, the controller 110 is coupled to an external wall switch 602 via a wall switch line 328. The controller 110 is configured to detect status changes in the wall switch 602 via wire 328 and can modify the power to load 502 based on the status changes. For example, in one case, based on the input from wall switch 602, the processor 316 within controller 110 can determine whether to modify the power on/off control (via relay 308) to load 502. In the embodiment shown in FIG. 6B, the controller 110 is configured to modify the power on/off control and/or dimming control to the load 502 based on status changes detected from wall switch 602.

Figure 7A:
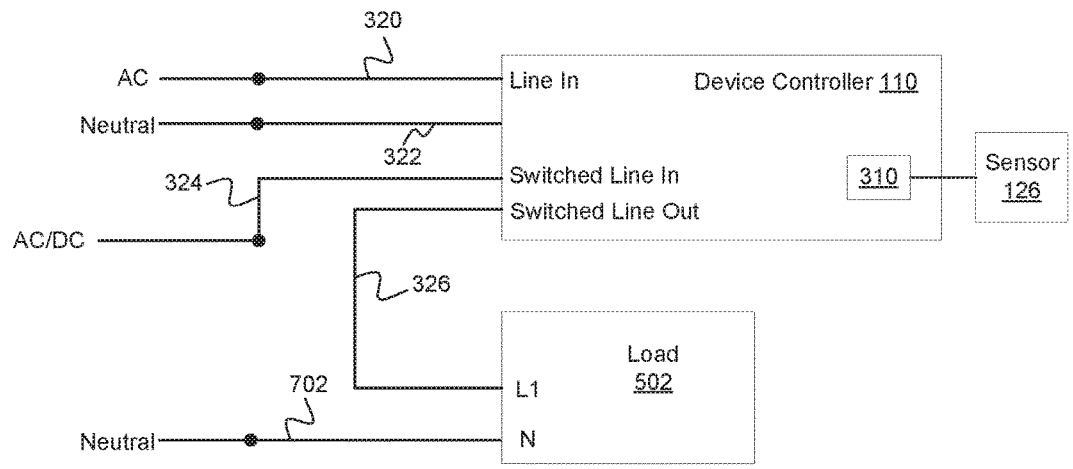
FIGS. 7A and 7B show wiring configurations of an integrated configurable wireless electronic device controller when operating in yet another mode of operation, according to embodiments of the present disclosure.
Figure 7B:
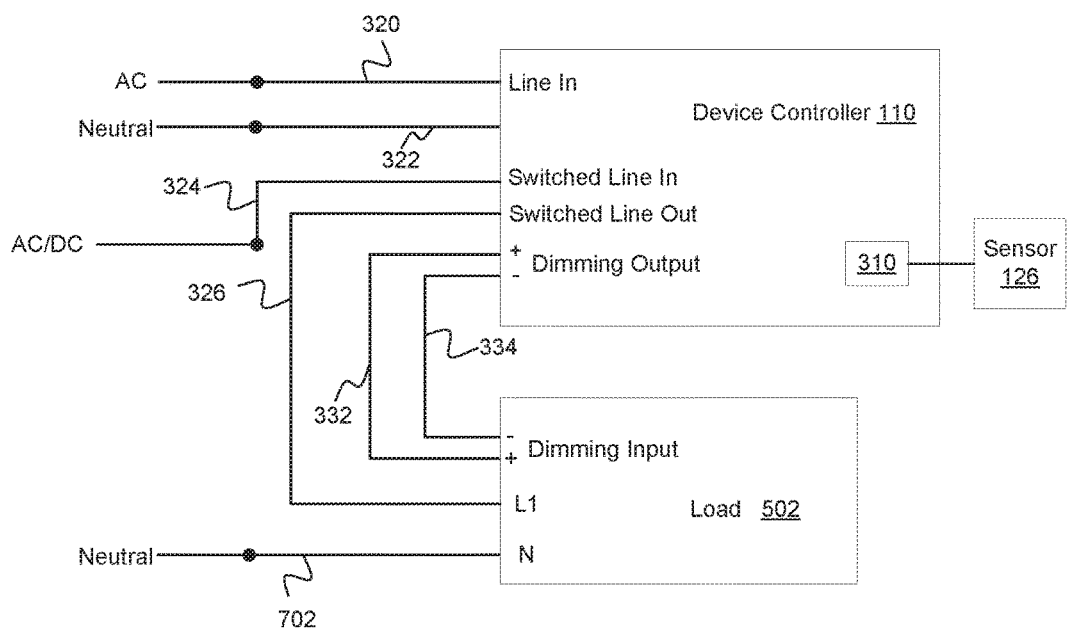

FIGS. 7A-7B show another mode of operation in which the controller 110 and the load 502 are powered from different power sources. As shown in FIG. 7A, for example, the circuit loop of the load is separated from the power circuit of the controller 110. The controller 110 may be powered by an AC source (e.g., 120-277V AC) via line input 320. However, the load 502 may be powered by an AC or DC source via switched line input 324. The power source for the load, for example, may be 120-277 V AC or 0=277 V DC. In FIG. 7A, (similar to FIG. 5A) the controller 110 is configured to provide on/off control to the load 502 via switched line output 326.

FIG. 7B shows an example where the controller 110 is configured to provide on/off control and/or dimming control to the load 502, according to another embodiment. For example, the controller 110 is configured to provide dimming control (e.g., 0-10V dimming) to the load 502 via dimming output control lines 332 and 334. Similar to FIG. 7A, the controller 110 and load 502 are powered via separate power sources.

In some embodiments, in another mode of operation (not shown), the controller 110 can be configured to measure one or more operating parameters of the load and/or power sources. For example, in one embodiment, the controller 110 can be coupled to a current transformer and configured to measure the AC current through the AC power source (e.g., line input 320). In another embodiment, the controller 110 can be configured to measure power (energy) consumption of the one or more loads coupled to the controller 110. Examples of the different types of information that may be collected include instantaneous power, aggregated power, power factor, current information, etc. Doing so in this manner helps users, utility providers, building managers, system operators, etc., identify the power load and distribution information, which may help to conserve power. For example, based on the energy measurement readings received, the controller 110 (e.g., via the at least one processor) can modify the power consumption of the one or more loads coupled to the controller in order to maintain a desired energy usage profile. The controller 110 can also report the energy measurement readings to a management system, which can be used for tracking energy usage.

Note, the wiring configurations described above with respect to FIGS. 5A-7B are provided as reference examples of how the integrated configurable wireless electronic device controller described herein can be configured when operating in one or more modes of operation. Those of ordinary skill in the art, however, will recognize that the integrated configurable wireless electronic device controller may be adapted or deployed in other configurations, which may be the same or different than the examples provided herein.

As mentioned above, the controller 110 can use the configurable port 310 as a sensor port to connect one or more sensors. As noted, the sensors can include occupancy sensors, ambient sensor, temperature sensors, humidity sensors, pressure sensors, air quality sensors, etc.). According to various embodiments, when directly coupled to one or more electronic devices in a particular environment (e.g., a room), the controller 110 can monitor the changing conditions within the environment with the sensor attached to the sensor port. For example, the controller 110 is capable of receiving, via the sensor port, one or more signals that correspond to sensor input from a sensor interfaced with the sensor port. Based on the information, the controller is capable of providing the information back to management system, determining to adjust the load utilization within the room by itself, or can receive user input (e.g., one or more commands) directly via remote devices connected to the network (e.g., computers, iPhones, or in general, any electronic device that has wireless communication function) to adjust the load utilization.

In some embodiments, the controller 110 can use the configurable port 310 to connect to a plurality of sensors. Configuring the port 310 as a port capable of supporting multiple sensors enables the controller 110 to provide greater control of managing energy consumed by the loads the controller is coupled to and/or measuring the conditions of a particular environment the controller is placed in.

Figure 8:
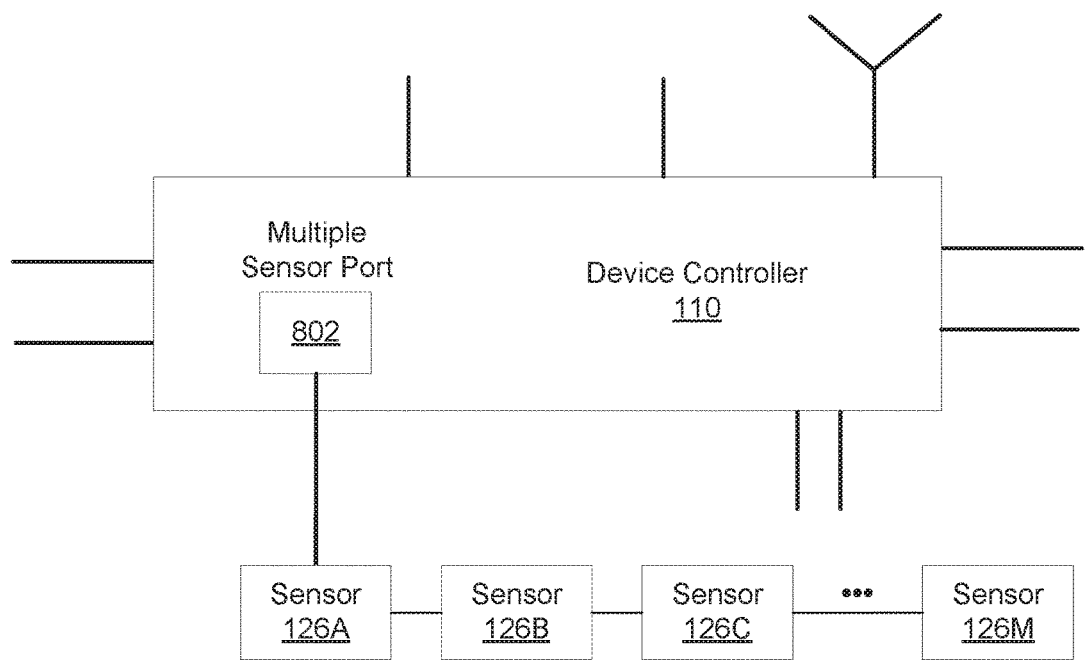
FIG. 8 illustrates an example integrated configurable wireless electronic device controller connected to multiple sensors, according to embodiments of the present disclosure.

FIG. 8 illustrates one example of how the controller 110 can connect to multiple sensors, according to one embodiment. As shown, the controller 110 includes a sensor port 802 that is connected to multiple sensors in a daisy-chained configuration. That is, multiple sensors 126A-M may be wired in series or another configuration, and the sensor port 802 can be connected to the first sensor 126A in the daisy-chain. In such a configuration, the controller 110 directly communicates with the first sensor 126A in the daisy-chain, and any commands issued to another sensor in the daisy-chain (e.g., to read sensor values) passes through the intervening sensors (e.g., sensors 126B-M) in the chain. Likewise, any sensor values that are returned to the controller 110 passes through the intervening sensors.

Figure 9:
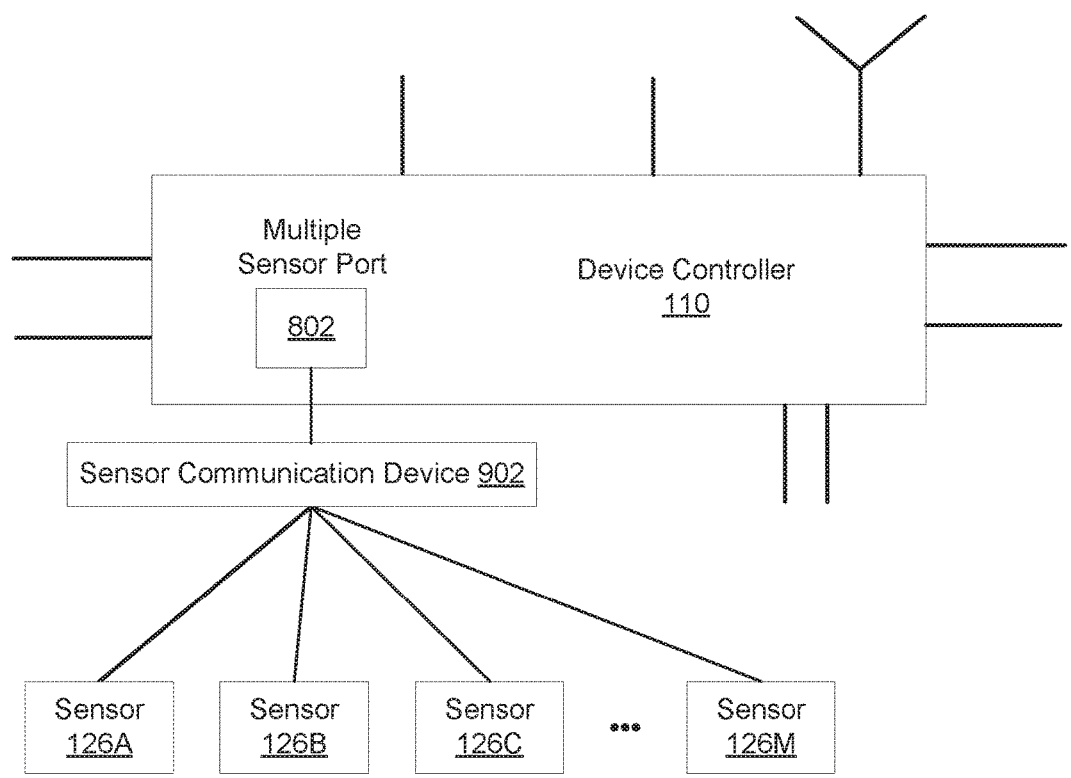
FIG. 9 illustrates another example of an integrated configurable wireless electronic device controller connected to multiple sensors, according to embodiments of the present disclosure.

FIG. 9 illustrates another example of how the controller 110 can connect to multiple sensors, according to one embodiment. As shown, in this embodiment, the controller 110 can connect to multiple sensors 126A-M via a sensor communication device 902. Such a device 902 may be a splitter, switch, hub, etc. In this configuration, the controller 110 can poll individual sensors connected to the device 902. For example, each sensor 126 may be individually addressable, which can allow the controller 110 to issue read/write commands to any individual sensor connected via the device 902.

In another embodiment, multiple sensors may communicate with the controller 110 via a wireless technology. For example, as noted above, such sensors could be battery operated sensors and communicate via WiFi (or another wireless technology). Allowing the controller to communicate with sensors via a wireless technology provides users or administrators more flexibility when integrating sensors in a particular environment. For example, instead of co-locating sensors with the controller, a controller may communicate with multiple sensors that may or may not be in the same room.

As mentioned above, the controller (disclosed in the various embodiments herein) is capable of communicating with a management system that is located on-premises or in the cloud (e.g., via a cloud computing infrastructure). Cloud computing generally refers to the provision of scalable computing resources as a service over a network. Typically, the cloud provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

In the context of the present disclosure, a controller (e.g., such as controller 110, etc.) is capable of communicating with a management system (e.g., energy management component 142) located in the cloud. That is, the controller is capable of communicating energy consumption measurements of one or more loads, changing conditions of a particular environment, etc., to a management system that could be located in any of the resources that reside in the cloud at any time, and from anywhere across the Internet. Further, user devices (e.g., computers, Iphones, etc.) may also be capable of communicating with the controller via any of the resources that reside in the cloud at any time. Allowing the controller to communicate with management systems located in the cloud provides additional flexibility and convenient control access compared to traditional control methods.

As mentioned above, the embodiments disclosed herein provide a flexible, easy to install, integrated configurable wireless electronic device controller that is capable of controlling a variety of different types of loads, capable of monitoring the power usage of the different types of loads, capable of monitoring one or more conditions of an environment, and is capable of automatically adjusting the power usage of the different types of loads based on its own monitoring. The electronic device controller disclosed herein may also be used in coordination with a management system, which may represent a centralized control entity on premises, or a distributed control entity in the cloud. With the use of the controller disclosed herein, the management system may receive more useful information that may be helpful for managers when analyzing energy efficiency.

While the foregoing is directed to embodiments of the present invention, other and further embodiments of the invention may be devised without departing from the basic scope thereof, and the scope thereof is determined by the claims that follow.

The various illustrative logical blocks, modules, and circuits described in connection with the disclosure herein may be implemented or performed with a processing system, general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure.

Certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various operations of methods described above may be performed by any suitable means capable of performing the corresponding functions. The means may include various hardware and/or software component(s).

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An integrated configurable electronic device controller for controlling at least one load coupled to the integrated configurable electronic device controller, the integrated configurable electronic device controller comprising:
   a communications interface operable to communicate via a wireless communications protocol;
   a sensor port operable to interface with at least one sensor; and
   a processing system configured to:
      receive, via the communications interface, one or more instructions for controlling power of the at least one load in an environment;
      monitor one or more operating parameters of the at least one load;
      receive, via a wall switch, one or more signals for controlling power to the at least one load, wherein the one or more signals comprise a dimming input signal;
      receive, from at least one sensor coupled to the sensor port, one or more inputs indicative of at least one of ambient light conditions, temperature, and occupancy of the environment; and
      generate one or more signals to control the power of the at least one load based, at least in part, on the one or more instructions, the one or more operating parameters, and the one or signals from the wall switch.

2. The integrated configurable electronic device controller of claim 1, wherein the processing system is further configured to report, via the communications interface, the one or more operating parameters, the one or more sensor inputs, and the one or more signals from the wall switch to a management system.

3. The integrated configurable electronic device controller of claim 1, wherein the one or more signals received via the wall switch further comprises a power override signal.

4. The integrated configurable electronic device controller of claim 1, wherein the at least one sensor comprises a plurality of sensors.

5. The integrated configurable electronic device controller of claim 1, wherein the at least one load comprises a bank of lights in series.

6. The integrated configurable electronic device controller of claim 1, wherein the wireless communications protocol is a 802.11 based communications protocol.

7. An integrated configurable electronic device controller for controlling at least one load coupled to the integrated configurable electronic device controller, the integrated configurable electronic device controller comprising:
   a communications interface operable to communicate via a wireless communications protocol;
   a sensor port operable to interface with at least one sensor; and
   a processing system configured to:
      receive, via the communications interface, one or more instructions for controlling power of the at least one load in an environment;
      monitor one or more operating parameters of the at least one load;
      receive, via two external three-way wall switches, one or more signals for controlling power to the at least one load;
      receive, from at least one sensor coupled to the sensor port, one or more inputs indicative of at least one of ambient light conditions, temperature, and occupancy of the environment; and
      generate one or more signals to control the power of the at least one load based, at least in part, on the one or more instructions, the one or more operating parameters, and the one or signals from the external two three-way wall switches.

8. A wireless electronic device control system, comprising:
   a plurality of loads daisy chained to a circuit;
   a management system; and
   a load controller electronically coupled to the circuit, wherein the load controller comprises:
      a communications interface operable to communicate via a wireless communications protocol;
      a configurable port; and
      a processing system configured to:
         receive, via the communications interface, one or more instructions for controlling power of at least one load of the plurality of loads;
         receive, via the configurable port, one or more inputs for adjusting a power level of the at least one load;
         generate one or more signals to control the power level of the at least one load based, at least in part, on the one or more instructions and the one or more inputs; and
         report, via the communications interface, the one or more inputs to the management system, wherein the at least one load comprises a plurality of light fixtures mounted on a ceiling of a room, and the load controller is mounted inside one of the plurality of light fixtures.

9. The wireless electronic device control system of claim 8, wherein each of the plurality of loads and the load controller are powered from a same power source.

10. The wireless electronic device control system of claim 8, wherein the management system is located in a cloud.

\* \* \* \* \*